Figure 1:
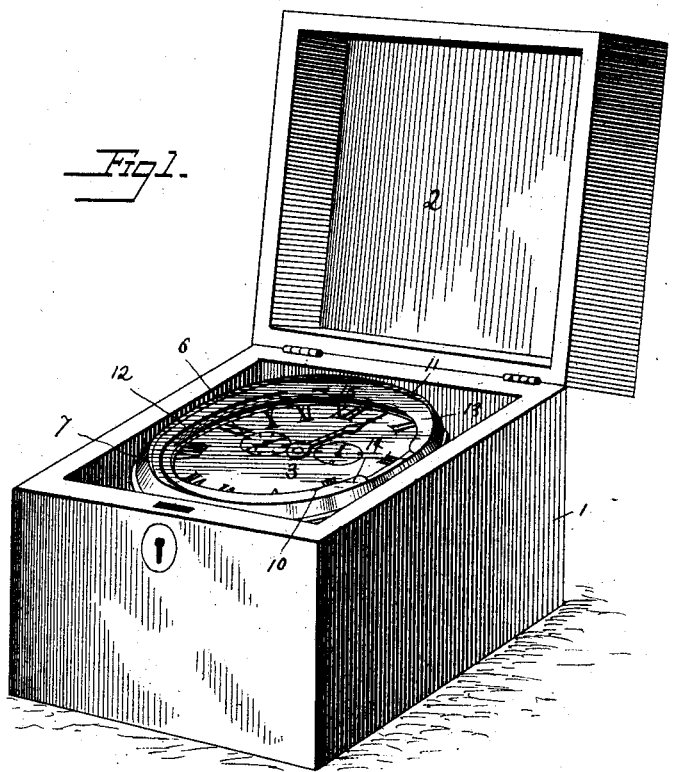

(No Model.) 2 Sheets—Sheet 1.

T. C. McLEAN.
THERMOMETER ATTACHMENT FOR SHIPS' CHRONOMETERS.

No. 370,400. Patented Sept. 27, 1887.

Witnesses
Inventor
T. C. McLean
By his Attorneys
Foster & Freeman (No Model.) 2 Sheets—Sheet 2.
T. C. McLEAN.
THERMOMETER ATTACHMENT FOR SHIPS' CHRONOMETERS.
No. 370,400. Patented Sept. 27, 1887.
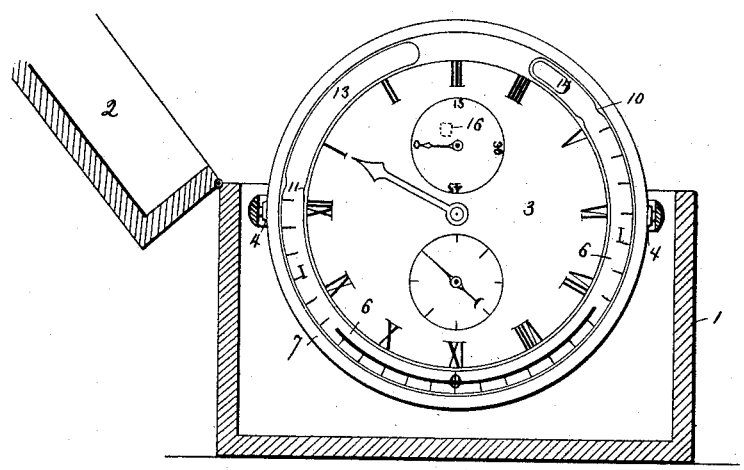
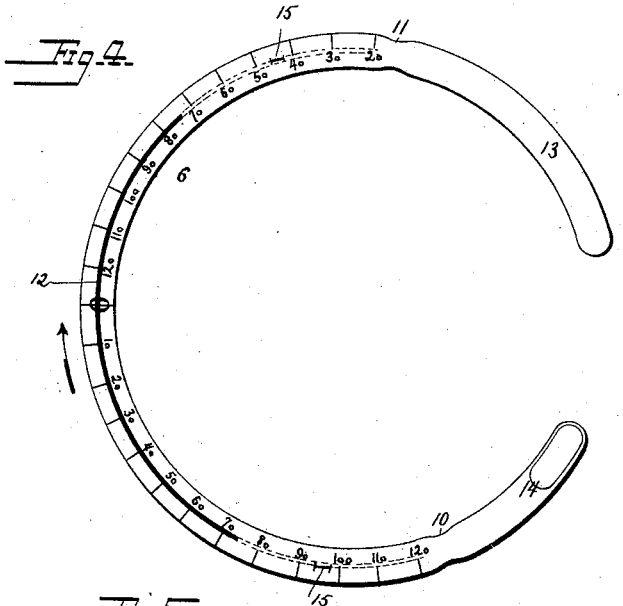
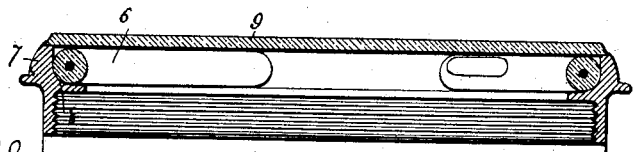
Witnesses
Inventor
By his Attorneys

UNITED STATES PATENT OFFICE.

THOMAS C. McLEAN, OF THE UNITED STATES NAVY.

THERMOMETER ATTACHMENT FOR SHIPS' CHRONOMETERS.

SPECIFICATION forming part of Letters Patent No. 370,400, dated September 27, 1887.

Application filed April 15, 1887. Serial No. 234,949. (No model.)

*To all whom it may concern:*

Be it known that I, THOMAS C. MCLEAN, United States Navy, a citizen of the United States, temporarily residing at Baltimore, Maryland, have invented certain new and useful Improvements in Chronometers, of which the following is a specification.

It is well known that chronometers, even when adjusted with great care and accuracy, do not keep absolutely correct time, but that they run fast or slow under variations of temperature, and it is the practice to test them under various conditions and to find the mean of the variation under different temperatures and to supply the user with a table giving these variations, so that he may be able to correct the time indicated by the chronometer under any specific conditions, and thereby get the true time. This is of the utmost importance in using chronometers where it is necessary to find the absolute true time as a basis for calculations, as in navigating, making observations, and the like, and it is the practice to have a thermometer arranged in proximity to the chronometer, so that the person making the observation as to time may note the condition of the temperature and correct the indications of the chronometer accordingly. Chronometers are usually inclosed in suitable cases or boxes, and even if a thermometer is arranged in proximity thereto it has been found that the true condition of the same is not correctly indicated, and the corrections made by such a thermometer are not accurate, and this is especially so when the chronometers are used at sea or other places where they are necessarily exposed to great climatic changes.

One of the objects of my invention is to so arrange and combine a thermometer with the chronometer that its true condition, as far as temperature is concerned, may be readily obtained, and so that the observations made may be as near as possible the equivalent of the test-observations by which its rate of variation was determined.

In carrying out this part of my invention I arrange and combine a thermometer with some convenient part of the chronometer where it will be exposed to the same changes of temperature as the works of the chronometer and where it will be a true indicator of the actual condition of the same, and I have shown the thermometer as mounted inside the case of the chronometer.

It is not only desirable to know the exact condition of the chronometer as regards temperature at the time of the observation, but to further aid in getting an accurate rating it is desirable to know the extremes of temperature to which the chronometer has been exposed for some given time, and to accomplish this I make use of a maximum and minimum or differential thermometer, and in carrying out this part of my invention I have constructed a new and improved form of differential thermometer, which I preferably make use of in this connection, as well as in other relations.

In order that my invention may be clearly understood, I will now more fully describe it in connection with the accompanying drawings, forming a part of this specification, and in which—

Figure 2:
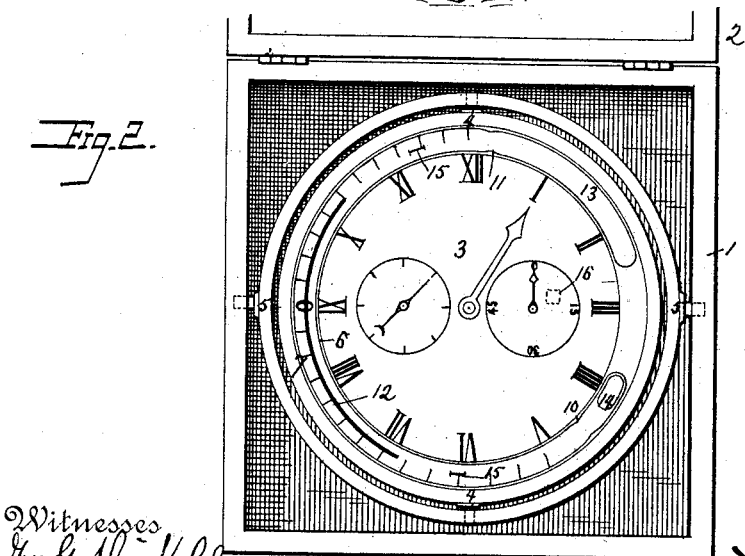

Figure 1 is a perspective view of a chronometer, showing one way of applying my invention thereto. Fig. 2 is a top plan of the same. Fig. 3 is a transverse section showing the chronometer tilted. Fig. 4 is a plan of my improved thermometer detached, and Fig. 5 is a section showing it mounted in the bezel of the chronometer.

A form of chronometer used in navigating is chosen as illustrating my invention; and it consists of a suitable case or box, 1, having a hinged cover, 2, inclosing the chronometer 3, which is upon gimbals 4 5, so that the face of the chronometer may always maintain a horizontal position, in a manner and for purposes well understood.

In order that the temperature of the operative parts of the chronometer may be known as accurately as possible, I arrange a thermometer, 6, within the case of the chronometer, and I have found the most convenient position for the thermometer to be that shown in the drawings—that is, around the bezel between the face and crystal—although it is to be understood that it may be differently arranged. The bezel 7 is usually made detachable from the case, and the inner edge, 8, is usually beveled between the plane of the crystal 9 and the face of the chronometer, and I have found I can place the thermometer in this space without interfering with the reading of the thermometer or chronometer, and without changing the construction of the chronometer, as the thermometer may be bent to the shape of the bezel, and will be easily held in position. I will remark, however, that, while the thermometer may be attached to the bezel without change, I prefer to round out or concave the surface thereof, as shown in Fig. 5, in order that a larger thermometer may be used and that it may be held more securely; but it will be seen that thermometers constructed in accordance with my invention may be readily applied to chronometers already made without expense and without interfering at all with their adjustment. It will also be seen that the thermometer is in actual contact with the metal of the chronometer and partakes of the same changes in temperature, and is therefore a correct indicator of the real condition thereof, and the crystal, being of non-heat-conducting material, as glass, serves to protect the thermometer, and at the same time gives free access to its indications.

Prior to my invention differential or maximum and minimum thermometers have been made, and, as usually constructed, they consist of a U-shaped tube having its ends expanded into large bulbs or globes to hold the methylic alcohol or other fluid above the mercury which remains in the lower part of the U-tube. Upon the mercury rest the indicator-slides, which rise with the column of mercury and which are provided with small springs bearing upon the inside of the tube and operating to hold the indicators in position by friction, and when the observation of their position has been made the indicators are drawn down into contact with the mercury by a magnet passed over the tube. Of course the use of such an arrangement in connection with a chronometer is impossible, for the reason the large bulbs would prevent the thermometer being applied to any part of the chronometer, and the use of the magnet would affect the running parts of the chronometer and disarrange its adjustment materially, and in order to overcome these difficulties I have invented a thermometer which I have shown embodied in a manner illustrated in Fig. 4. This thermometer consists of a hollow tube bent in the form of an arc of a circle, the part between the points 10 and 11 having a contracted passage, 12, in which the mercury flows, and the parts between the said points and the ends having an expanded passage, 13 14, forming reservoirs for the lighter fluid. As these reservoirs preferably bear certain relations in capacity to each other and to the mercury-passage, by making them of the form shown I can accurately gage them as desired, and at the same time maintain the outer form as a continuation of the mercury-tube. In the instance shown in the drawings one bulb of the thermometer, as 13, is filled with alcohol or similar expansive liquid, while the other bulb, 14, is only partially filled with the same or similar liquid, leaving an air-space (represented by the bubble in the drawings) in the bulb, and the contracted tube connecting these two bulbs contains a column of mercury.

The operation of this device may be described as follows: As the temperature rises, the alcohol or other liquid in the bulb 13, which contains no air, expands and forces the mercury toward the end or bulb containing the air and liquid. Of course the liquid in this bulb also expands under the influence of the temperature, but the air becomes compressed and the preponderance of pressure will be on the side of the bulb containing no air. When the temperature falls, the liquid in both bulbs of course contracts, but the air, being an elastic gas under pressure, acts to force the mercury toward the other limb or bulb containing no air. The scale marked upon the thermometer must be made in accordance with the known or tested ratios of expansion and contraction of the liquid and air in the two bulbs. It will thus be seen that the thermometer operates perfectly as a maximum and minimum thermometer while in a horizontal position.

The floats or indicators 15 may be of glass or any other suitable material, and as long as the thermometer remains in a horizontal position they will occupy the position into which they are forced by the mercury, and will clearly indicate the extremes of movement of the mercury, as is well understood. When the thermometer is turned up, they will fall down into contact with the mercury in the tube. I take advantage of the fact that chronometers as usually constructed have to be turned up or over to be wound, the key-hole 16 being in the rear, and that this is done at the time the regular observation and record of the thermometer is made, and I therefore so arrange the middle point of the thermometer on the chronometer that it will be lowermost when the chronometer is turned up to be wound. Thus, as indicated in Fig. 2, the middle point of the thermometer is adjacent to the hour-mark IX, and when the chronometer is turned up to be wound, as shown in Fig. 3, after the observation has been made and noted, the indicators 15 will fall down upon the mercury-column on either side. It will thus be seen that the indicators are automatically restored to their normal position in performing the usual operations with the chronometer.

In order that the indications on the thermometer may be more easily and definitely read, I arrange the indicating marks or figures thereon so that the most of them will be right side up, as clearly shown in Fig. 4—that is, the most of them are in a position to be easily read from one side—and I preferably make the digits larger than the zero-figures, as I am enabled thereby to make the more prominent numbers larger and plainer without unduly covering the tube or interfering with the examination of the position of the mercury-column or the indicators.

While I have shown the thermometer as combined with the bezel of the chronometer, as I have found that a desirable and practical position for it, it will be understood that I do not limit my invention to that particular arrangement, as it may be applied to the chronometer in other positions with the same effect; and I would further remark that while I have also shown my improved thermometer in connection with a chronometer it will be understood that it may be used either in such combination alone or in combination with other devices.

What I claim is—

1. A chronometer having a maximum and minimum thermometer arranged within the case thereof, whereby the present and extremes of the past condition of the chronometer may be simultaneously indicated, substantially as and for the purposes set forth.

2. The combination, with a chronometer, of a thermometer inclosed within the case of the chronometer and supported upon the crystal-bezel, substantially as described.

3. The combination, with a chronometer mounted in gimbals, of a differential thermometer mounted on the chronometer, the arrangement being such that the indicators of the thermometer will be automatically restored to their normal position upon turning the chronometer, substantially as described.

4. An arc-shaped differential thermometer the body of which contains mercury and has extended ends for the lighter expansible fluid of substantially the same size as the body, substantially as described.

5. An arc-shaped thermometer-tube the body of which is of substantially the same size throughout, the central part of which is provided with a small passage for the reception of the mercury, and the ends of which are provided with enlarged passages for the reception of the lighter fluid, substantially as described.

6. The combination, in a differential thermometer, of the mercury and lighter fluids inclosed therein, and the indicator-slides normally in contact with the mercury and freely moving in both directions in the lighter fluid, substantially as described.

7. An arc-shaped differential thermometer in which the series of maximum and minimum indicating-marks on the arms thereof are reversed, whereby they can be read from one side, substantially as described.

8. The combination, with a chronometer the bezel of which is concaved, of an arc-shaped thermometer arranged in said bezel, substantially as described.

In testimony whereof I have signed my name to this specification in the presence of two subscribing witnesses.

THOMAS C. McLEAN.

Witnesses:
W. CLARENCE DUVALL,
F. L. FREEMAN.